Dec. 28, 1954    C. E. BRICKER ET AL    2,698,021
INERTIA VALVE ANTISKID CONTROL
Filed Feb. 27, 1953
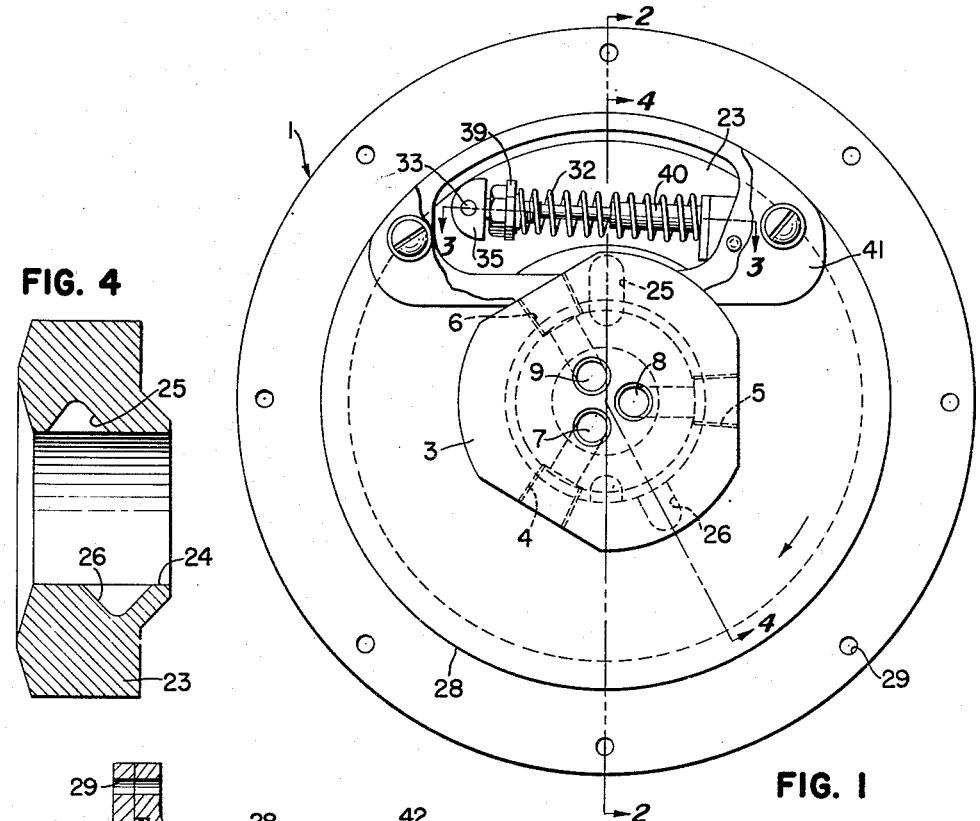
FIG. 4
FIG. 1
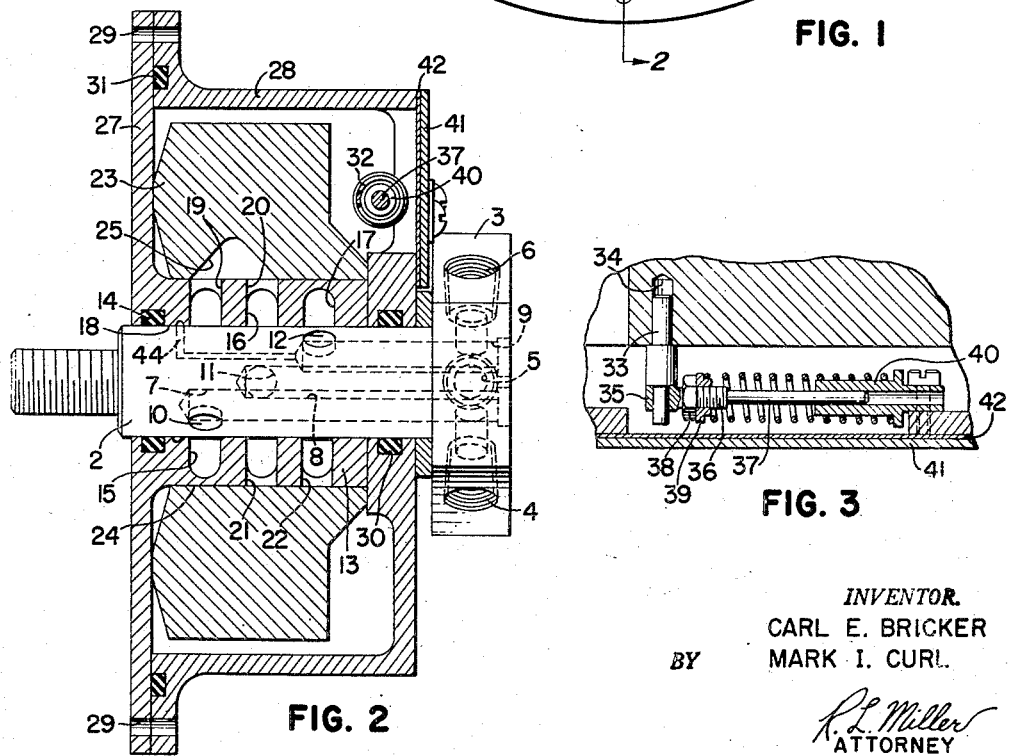
FIG. 2
FIG. 3
INVENTOR.
CARL E. BRICKER
MARK I. CURL
BY
R. L. Miller
ATTORNEY United States Patent Office 2,698,021
Patented Dec. 28, 1954

2,698,021

INERTIA VALVE ANTISKID CONTROL

Carl E. Bricker, Akron, and Mark I. Curl, Cuyahoga Falls, Ohio, assignors, by mesne assignments, to The Goodyear Tire & Rubber Company, a corporation of Ohio Application February 27, 1953, Serial No. 339,367

8 Claims. (Cl. 137—48)

This invention relates to means for use in preventing skidding of wheels being braked, and particularly relates to a novel type of an inertia controlled valve which is used in a brake actuation circuit for terminating or at least reducing brake actuation pressure when the wheel with which the brake control means is associated has had such severe braking forces applied thereto as to, if unchecked, lead to a skidding condition in the wheel being braked.

Anti-skid controls such as referred to hereinbefore are particularly adapted for use with aircraft wheels to prevent skidding of such wheels as such skidding action produces undesirable wear and stress on the pneumatic tires used to support the airplane, while the excessive braking forces usually required to produce a skidding action and the resultant stresses set up in the brakes may strain or stress such brakes or brake support means excessively and cause failure thereof.

It is a general object of the present invention to provide a new and improved type of an inertia valve sensitive to positive or negative acceleration and used in brake anti-skid control means wherein the control valve is characterized by the use of an inertia member rotating in unison with the wheel being braked, but free to move with relation thereto, for controlling brake actuation when a slipping action is produced in the wheel being braked by a rapid deceleration being produced in the wheel.

Another object of the invention is to provide a relatively small, uncomplicated inertia acting valve which is easily connected into a brake actuation system and which is adapted to terminate brake actuation when the brake action causes the wheel to decelerate (negative acceleration) at a rate in excess of the deceleration rate of the vehicle, or at a rate in excess of a preselected rate, to thereby anticipate and prevent skidding.

Yet a further object of the invention is to provide an inertia actuated valve in anti-skid control means wherein a rotary control member in the inertia valve is resiliently restrained from movement with relation to a rotary carrier sleeve but which will move with relation to the carrier sleeve against the restraining force when the rapid deceleration preceding a locked wheel skid is produced in the wheel means to which the control means are connected.

The foregoing and other objects and advantages of the invention will be made more apparent as the specification proceeds.

For a better understanding of the invention, reference should be had to the accompanying drawing wherein:

Fig. 1 is an elevation of an inertia valve embodying the principles of the invention and a cover plate is partially broken away to show some of the control means within the inertia valve of the invention;

Fig. 2 is a vertical section taken on line 2—2 of Fig. 1 with the valve shaft and end flange being shown in side elevation;

Fig. 3 is a fragmentary horizontal section taken on line 3—3 of Fig. 1; and

Fig. 4 is a reduced scale vertical section of the rotor member taken on line 4—4 of Fig. 1.

In order to facilitate comparison between corresponding parts on the drawing and in the specification, corresponding numerals are used to refer to such corresponding parts in the drawing and specification.

The brake anti-skid apparatus of the invention primarily relates to an inertia actuated control valve which is connected in the hydraulic system of the brake actuation means for the wheel whose action is to be controlled, and with a stationary valve shaft being provided in the control and having a plurality of passageways therein connecting to the periphery of the valve shaft. A rotary valve member is present in the control and it is suitably connected to and rotates with the wheel whose action is being controlled by the anti-skid apparatus of the invention. Such rotary valve member is journaled on the valve shaft and controls, partially, the path of fluid flow through the valve shaft, while a rotor is carried by the rotary valve member and normally rotates therewith but is free to move with relation thereto under its own inertia when a sudden braking force is applied to the wheel. The rotor has different fluid flow paths therein at spaced circumferential portions thereof that connect to and complete the flow path through the rotary valve member for determining the path of fluid flow through the control valve, and spring means are provided for resiliently urging the rotor to a normal operating position on the rotary valve member.

With relation to the details of the structure shown in the drawings, brake anti-skid control apparatus is shown and in general includes the inertia-actuated valve 1 indicated as a whole by the numeral 1. This inertia actuated valve 1 includes a stationary valve shaft 2 which is suitably secured to some stationary member, such as a support strut (not shown). The valve shaft 2 has an end flange 3 thereon on the outboard side of the anti-skid control means, as assembled with a wheel unit. The end flange 3 has a plurality of ports 4, 5 and 6 suitably provided therein, and usually tapped for engaging with fluid conduits (not shown) used to connect the valve 1 in a brake system. The valve shaft 2 has a plurality of axially directed bores 7, 8 and 9 formed in circumferentially spaced portions of the valve shaft with one port 4 to 6 connecting to one of the bores 7 through 9, respectively. Normally the port 4 is the inlet port for hydraulic fluid under pressure for use in brake operation, the port 5 connects to a conduit leading to the brake for transmittal of actuation pressure thereto, and port 6 connects to the fluid return line. Fig. 2 of the drawings best shows that the bores 7, 8 and 9 extend along the valve shaft 2 different lengths and connect to the periphery of the shaft 2 at different circumferential portions thereof by outlets or ports 10, 11 and 12, respectively.

In order to aid in controlling the flow of fluid through the control device of the invention, a rotary valve member or sleeve 13 is carried by and journalled on the valve shaft 2 and it positions a suitable packing ring 14 in sealing relationship to one end of the valve shaft 2, as indicated in the drawings. The rotary valve member 13 has a plurality of annular recesses 15, 16 and 17 provided in axially spaced portions thereof and connecting to, or extending from a bore 18 of the rotary valve member or sleeve 13. Fig. 2 of the drawings best shows that outlet bores 19 and 20 are provided in the recesses 15 and 16 in immediately adjacent axial and circumferential relationship to facilitate forming a fluid path or connection between the recesses 15 and 16 and fluid flowing therefrom to the bores 19 and 20. A pair of similar outlet bores 21 and 22 are formed in the recesses 16 and 17 in desired circumferentially spaced relation, and shown as diametrically opposed to the outlet bores 19 and 20, all as indicated best in Fig. 2. Thus the outlet bores 21 and 22 provide means by which the recesses 16 and 17 can be connected for fluid flow therebetween, when desired. The actual member used for controlling or determining the path of fluid flow through the control means of the invention comprises a rotor 23. This rotor 23 is journalled on the outer periphery of the rotary valve or sleeve member 13 and it has a bore 24 extending therethrough with a pair of recesses 25 and 26 being provided in the bore 24 at circumferentially spaced portions thereof and extending axially a short distance of the rotor 23. These recesses 25 and 26 are provided for connecting either the pair of outlet bores 19 and 20 together for a flow of fluid therebetween, as indicated in Fig. 2, or the recess 26 would be aligned with the outlet bores 21 and 22 to connect them together under normal operating conditions, and substantially as soon as the rotor 23 is moved circumferentially with relation to the rotary valve 13 the recess 25 is moved to register with outlet bores 19 and 20 to change the connection of fluid paths in the valve 1.

The rotor 23 is secured in position by a flange 27 usually formed integrally with the rotary valve member 13 and by a housing 28 which cooperates with the flange 27 to form an enclosure for the rotor 23 and other control means of the invention. Any conventional means (not shown) may extend through aligned holes 29 provided in adjacent portions of the flange 27 and housing 28 so that such flange and housing can be secured together and can be rotated at the same speed as the wheel with which the apparatus of the invention is associated for controlling anti-skid action therein. The housing 28 also positions a suitable O-ring or other packing member 30 therein to seal the shaft 2 in the valve 1. Usually the housing 28 may also seat another packing member or ring 31 where the housing engages the flange 27 so that a sealed valve chamber is provided.

In order to position the rotor 23 in normal desired operative relationship with the rotary valve member 13, and to return such rotor to normal operating conditions when it is moved therefrom, a rotor return spring 32 is provided and is used in a resilient connection between the housing 28 and the rotor 23. Such rotor return spring 32 operatively engages a pin 33 which is seated in a recess or hole 34 formed in the rotor 23 and with the pin 33 extending from the rotor and engaging a clevis 35 which has a threaded axial section 36 with a guide pin 37 extending therefrom. A lock nut 38 engages the threaded portion 36 of the clevis 35, while a spring seat ring 39 is telescopically engaged with the shaft portion of the clevis and one end of the spring 32 seats thereon for engagement with the rotor 23 thereby. A clevis housing, or sleeve 40 is secured to the housing 28 adjacent an opening in the housing over which a cover plate 41 is positioned to provide an access opening therein. The cover plate 41 is sealed in engagement with the remainder of the housing by a gasket 42. As the cover plate 41 is positioned adjacent the spring 32 and its positioning means, removal of the cover plate 41 permits adjustment or access to the spring to inspect and perform maintenance thereon or to adjust its setting. By varying the position of the lock nut 38, the force exerted by the spring 32 can be varied within controllable limits. Thus the spring 32, being connected between the rotor 23 and the housing 28, will normally maintain the rotor 23 in desired operative position on the rotary valve member 13 so that the outlets 21 and 22 are normally connected and fluid supplied to the valve 1 under pressure will be passed to the brake actuation means through the valve means referred to hereinbefore in detail. However, when a sudden braking force is applied to the wheel with which the control unit of the invention is associated, then the housing 28 and means connected thereto will be stopped abruptly, or at least in ratio to the wheel de-acceleration, dependent upon the manner in which the wheel is braked and the manner in which the housing 28 connects to such wheel. In all events, at such time the rotor 23 will have appreciable inertia therein and will not stop or be de-accelerated at the same ratio as the housing 28 so that the inertia forces in the rotor 23 will cause it to move against the resistance of the spring 32 and change the connection heretofore made between the outlet bores 21 and 22 over to connecting the outlet bores 19 and 20 by the recess 25 formed in the bore of the rotor. At that time, the relative rotational movement between the rotor and the rotary valve member will cause the rotor to be positioned as shown in Fig. 2 at which time the outlet bores 19 and 20 are connected and fluid will flow from the brake to the return line through the bores and connecting means provided in the valve shaft 2. Normally, of course, the outlet bores 21 and 22 are connected for passage of fluid under pressure to the brake. In the design of the apparatus of the invention, the direction of rotation of the flange and rotary valve member 13 must always be clockwise as viewed from the outboard side of the valve unit.

The housing 28 is suitably connected to the wheel whose action is to be controlled so that the housing rotates at the same or proportional speed as the wheel.

Fig. 2 shows that a drain recess 43 is provided in the bore 18 of the rotary valve member 13 for liquid seeping along the shaft 2. A drain bore 44 is provided in the shaft 2 and connects between the recess 43 and the bore 9 to remove leakage fluid from the valve.

Thus it will be seen that a positive acting, mechanical device of relatively inexpensive, simple construction has been provided by the invention, so that the objects of the invention are achieved.

While certain representative embodiments and details have been shown for the purpose of illustrating the invention, it will be apparent to those skilled in this art that various changes and modifications may be made therein without departing from the spirit or scope of the invention.

What is claimed is:

1. A brake anti-skid valve comprising a stationary shaft having a plurality of longitudinally extending bores having outlets connecting to the shaft periphery at longitudinally spaced portions of the shaft, a flanged sleeve journalled on said shaft, a rotor journalled on said sleeve and normally rotating therewith, housing means enclosing said rotor and engaging said flanged sleeve for normal rotation therewith, the bore of said sleeve having a plurality of annular recesses therein for individually and continuously engaging the outlets of said bores, an outlet being provided for each annular recess through to the periphery of said sleeve, said rotor having different connecting recesses at circumferentially spaced portions thereof for connecting different pairs of said sleeve recess outlets, and spring means for normally maintaining said rotor in fixed operative relation to said sleeve.

2. A brake anti-skid valve comprising a stationary shaft having a plurality of longitudinally extending bores having outlets connecting to the shaft periphery at longitudinally spaced portions of the shaft, a sleeve journalled on said shaft, a rotor journalled on said sleeve and normally rotating therewith, housing means enclosing said rotor and engaging said sleeve for rotation therewith, the bore of said sleeve having a plurality of annular recesses therein for individually and continuously engaging the outlets of said bores, an outlet being provided for each annular recess through to the periphery of said sleeve, said rotor having different connecting recesses at circumferentially spaced portions thereof for connecting different pairs of said sleeve recess outlets, and spring means for normally maintaining said rotor in fixed operative relation to said sleeve.

3. A brake anti-skid valve comprising a stationary shaft having a plurality of longitudinally extending bores having outlets connecting to the shaft periphery at longitudinally spaced portions of the shaft, a sleeve journaled on said shaft, a rotor journaled on said sleeve and normally rotating therewith, housing means enclosing said rotor and sleeve and engaging said sleeve for normal rotation therewith, the bore of said sleeve having a different annular recess for individually and continuously engaging the outlets of said shaft bores, an outlet being provided for each said annular recess through to the periphery of said sleeve, one of said annular recesses having two circumferentially spaced outlets provided therein, said rotor having different connecting recesses at circumferentially spaced portions thereof for connecting pairs of said sleeve recess outlets to control the path of liquid flow through the valve, one of the outlets of said annular recess with two outlets therein always being in the liquid flow path, and spring means for normally maintaining said rotor in operative relation to said sleeve.

4. In brake anti-skid apparatus, an inertia actuated control valve comprising a stationary valve shaft with a plurality of fluid passageways therein connecting to the periphery of the shaft, a rotary valve member journaled on said valve shaft and connecting to said fluid passageways for use in controlling the path of flow of fluid through the said valve shaft, a rotor carried by said rotary valve member and normally rotating therewith but being free to move with relation thereto, said rotor having different fluid flow paths therein at different circumferential portions thereof connecting to and completing said rotary valve member to complete and determine the path of flow of fluid through the control valve, and spring means for resiliently urging said rotor to a normal operating position on said valve member.

5. In brake anti-skid apparatus, an inertia actuated control valve comprising a stationary valve shaft with a plurality of fluid passageways therein connecting to the periphery of the shaft, a rotary valve member journalled on said valve shaft for use in controlling the path of flow of fluid through the said valve shaft, a rotor carried by said rotary valve member and normally rotating therewith but being free to move with relation thereto, said rotor having different fluid flow paths therein at different circumferential portions thereof connecting to and completing said rotary valve member to complete and determine the path of flow of fluid through the control valve, and spring means for resiliently urging said rotor to a normal operating position on said valve member.

6. In brake anti-skid apparatus, a stationary valve shaft and a rotary valve means adapted for rotation with a wheel to be controlled journalled on said valve shaft, said rotary valve means including a valve body with a plurality of passages therein and a rotor carried by said valve body and normally rotating therewith but adapted for relative rotation with relation thereto when the wheel is rapidly deaccelerated to change the fluid flow path in said valve means at such time, and spring means mounted on said valve body and arranged to bias relative rotational movement of said rotor.

7. In brake anti-skid apparatus, a stationary valve shaft and a rotary valve means for rotation with a wheel to be controlled journalled on said valve shaft, said rotary valve means including a valve sleeve rotatably mounted about said shaft and a rotor rotatably mounted about said sleeve for relative rotation with relation thereto when the wheel is sharply de-accelerated to change the fluid flow path is said valve means at such time.

8. In brake anti-skid apparatus, a stationary valve shaft having a plurality of different fluid passageways therein, a rotary valve sleeve for rotation with a wheel to be controlled, said rotary valve sleeve being journalled on said valve shaft and connecting certain of said passageways to determine the path of flow of liquid through said valve sleeve, said rotary valve sleeve having a rotor mounted thereon for relative rotation with relation thereto when the wheel is sharply de-accelerated to change the fluid flow path in said valve means at such time, and spring means mounted between said sleeve and said rotor and arranged to bias such relative rotation.

References Cited in the file of this patent

UNITED STATES PATENTS

| Number | Name | Date |
|---|---|---|
| 2,407,982 | Hanna et al. | Sept. 24, 1946 |
| 2,656,017 | Trevaskis | Oct. 20, 1953 |

FOREIGN PATENTS

| Number | Country | Date |
|---|---|---|
| 401,816 | Germany | Sept. 19, 1924 |
| 200,867 | Great Britain | July 16, 1928 |